United States Patent
Mondal et al.

(10) Patent No.: US 11,233,566 B2
(45) Date of Patent: Jan. 25, 2022

(54) SYSTEM AND METHOD FOR MANAGING INTERFERENCE IN OPTICAL CAMERA COMMUNICATION BASED NETWORK

(71) Applicant: Wipro Limited, Bangalore (IN)

(72) Inventors: Subhas Chandra Mondal, Bangalore (IN); Shailesh Prabhu, Manipal (IN)

(73) Assignee: Wipro Limited, Bangalore (IN)

(*) Notice: Subject to any disclaimer, the term of this patent is extended or adjusted under 35 U.S.C. 154(b) by 103 days.

(21) Appl. No.: 16/774,007

(22) Filed: Jan. 28, 2020

(65) Prior Publication Data
US 2021/0184765 A1 Jun. 17, 2021

(30) Foreign Application Priority Data
Dec. 12, 2019 (IN) .............................. 201941051499

(51) Int. Cl.
*H04B 10/00* (2013.01)
*H04B 10/116* (2013.01)
(Continued)

(52) U.S. Cl.
CPC ....... *H04B 10/116* (2013.01); *H04B 10/1143* (2013.01); *H04B 10/40* (2013.01); *H04L 5/0057* (2013.01); *H04N 7/22* (2013.01)

(58) Field of Classification Search
CPC .. H04B 10/116; H04B 10/1143; H04B 10/40; H04B 10/1129; H04B 10/1149;
(Continued)

(56) References Cited

U.S. PATENT DOCUMENTS

| 8,412,103 B2 | 4/2013 | Srinivasan et al. |
| 2010/0215378 A1* | 8/2010 | Rajagopal .......... H04B 10/1143 398/158 |

(Continued)

FOREIGN PATENT DOCUMENTS

| CA | 2826240 A1 | 8/2012 |
| CN | 101926139 A | 12/2010 |
| JP | 2009089361 A | 4/2009 |

OTHER PUBLICATIONS

Chowdhury, M., et al., "Integrated RF/Optical Wireless Networks for Improving QoS in Indoor and Transportation Applications", Wireless Personal Communications, 2018, vol. 107, pp. 1401-1430.
(Continued)

*Primary Examiner* — Hibret A Woldekidan
(74) *Attorney, Agent, or Firm* — Finnegan, Henderson, Farabow, Garrett & Dunner, LLP (57) ABSTRACT

A method and system for managing interference between transmission sources in an Optical Camera Communication (OCC) network is disclosed. The method includes receiving interference information associated with a set of transmission sources. Each of the set of transmission sources include a set of light sources configured to display one of a plurality of colors. The method further includes assigning a unique guard band to each of the set of transmission sources. The method includes sharing details of the unique guard band assigned to a first transmission source within the set of transmission sources with the camera. The camera is configured as the receiver of the first transmission source. The method further includes instructing the camera to accept data transmitted by the first transmission source based on the assigned unique guard band and drop data transmitted by the remaining set of transmission sources.

14 Claims, 9 Drawing Sheets

(51) Int. Cl.
*H04B 10/114* (2013.01)
*H04B 10/40* (2013.01)
*H04L 5/00* (2006.01)
*H04N 7/22* (2006.01)

(58) Field of Classification Search
CPC ..... H04J 14/0227; H04L 5/0057; H04N 7/22; G02B 21/0032; G02B 21/0056; G02B 21/0076; G02B 21/16
USPC .......................... 398/128, 118, 130, 127, 172
See application file for complete search history.

(56) References Cited

U.S. PATENT DOCUMENTS

2017/0353963 A1* 12/2017 Hong .................. H04W 72/082
2019/0028193 A1* 1/2019 Miras ................ H04B 10/1129

OTHER PUBLICATIONS

Jung, S.Y., et al., "Inter-cell interference mitigation in multicellular visible light communications", 2016, vol. 24, No. 8, 15 pages.
Martinez, E.R., et al., "Inter Cell Interference Coordination techniques in HETNETS, Almost Blank Sub-Frames approach", Universitat Politechnica de Catalunya, Jun. 2013, 53 pages.
Miras, D., et al., "A High Data Rate LiFi Integrated System with Inter-cell Interference Management", 2018 IEEE Wireless Communications and Networking Conference (WCNC), 6 pages.

\* cited by examiner

SYSTEM AND METHOD FOR MANAGING INTERFERENCE IN OPTICAL CAMERA COMMUNICATION BASED NETWORK

TECHNICAL FIELD

This disclosure relates generally to Optical Camera Communication (OCC) networks, and more particularly to a system and method for managing interference between transmission sources in an optical camera communication network.

BACKGROUND

The demand for wireless data communication is increasing at a very high rate. To keep up with this growing demand, the available Radio Frequency (RF) spectrum of below 10 GHz may not be sufficient. As an alternative, Optical Wireless Communication (OWC) involves communication over a light channel by a transmit-receive (transceiver) pair. The transceiver pair can transmit information using a Light Emitting Diode (LED) and receive information using a light sensor, such as, a photo diode or a camera.

Optical Camera Communication (OCC) may be one of the forms of OWC. The OCC involves a camera that is used to decode information received from a transmitter. The transmitter transmits the information by encoding it in a spatially arranged color codes. Thus, while information transmission is based on emitting the encoded frames in color codes, reception is based on capturing the image of the transmitted information and extracting the spatial information which could be used to decode transmitted data.

The OCC may further include a screen based transmission scheme and an LED based transmission scheme. In a screen based transmission scheme, a set of color patterns may be used to encode information that is to be transmitted. As an example of spatially arranged coding scheme used in OCC, a Quick Response (QR) code based communication may be used that displays QR codes on a display screen. In this scheme, the information to be transmitted may be broken up into smaller blocks to generate a sequence of QR codes. Each QR code in the sequence may be displayed for a small time-interval before the next QR code in the sequence is displayed. The display interval for a QR code in the sequence may be based on a capture rate of the camera.

In the LED based transmission scheme, the information to be transmitted is encoded by color codes emitted by a set of spatially arranged LEDs. In this case, the color emitted by each LED may carry a number of bits from the information block depending on the number of colors that may be decoded by a receiving camera. If more number of colors are used to encode the information, the overall throughput may increase. The receiving camera sensitivity, distance between the transceivers, background illumination, and media condition play a key role in determining how many colors may be used to encode the transmitted information.

However, in the OCC, when there are two or more transmission sources in the capture area of a receiver camera, there is no existing systems to mitigate the interference cause under this scenario. Moreover, in the interference region, there is no method to detect physical cell Identifiers (IDs) of the transmission sources associated with the receiver camera. As a result, when a user associated with the receiver camera comes in the vicinity of multiple such transmission sources, the user may not be able to communicate with an intended transmission source in the interference region. Hence, interference management and multi-access in the interference region within the OCC systems remains a key challenge.

SUMMARY

In one embodiment, a method for managing interference between transmission sources in an Optical Camera Communication (OCC) network is disclosed. The method includes receiving, by an interference management device, interference information associated with a set of transmission sources, wherein each of the set of transmission sources are within a capture area of a camera. Each of the set of transmission sources comprises a set of light sources configured to display one of a plurality of colors. The method further includes assigning, by the interference management device, a unique guard band to each of the set of transmission sources based on the interference information. The method includes sharing, by the interference management device, details of the unique guard band assigned to a first transmission source within the set of transmission sources with the camera. The camera is configured as the receiver of the first transmission source. The method further includes instructing, by the interference management device, the camera to accept data transmitted by the first transmission source based on the assigned unique guard band and drop data transmitted by the remaining set of transmission sources.

In another embodiment, a method for managing interference between transmission sources in an OCC network is disclosed. The method includes detecting, by a camera based receiver, interference from a set of transmission sources. Each of the set of transmission sources are within a capture area of a camera associated with the camera based receiver. Each of the set of transmission sources comprises a set of lights configured to display one of a plurality of colors. The method further includes receiving, by the receiver camera, details of a unique guard band assigned to a first transmission source within the set of transmission sources. The camera is configured to receive the first transmission source, and wherein each of the set of transmission sources is assigned a unique guard band. The method includes processing, by the receiver associated with a camera, data transmitted by the set of transmission sources. The processing includes accepting data transmitted by the first transmission source based on the assigned unique guard band and dropping data transmitted by the remaining set of transmission sources.

In another embodiment, a system for managing interference between transmission sources in an OCC network is disclosed. The system includes a processor and a memory communicatively coupled to the processor, wherein the memory stores processor instructions, which, on execution, causes the processor to receive interference information associated with a set of transmission sources. Each of the set of transmission sources are within a capture area of a camera. Each of the set of transmission sources comprises a set of light sources configured to display one of a plurality of colors. The processor instructions further cause the processor to assign a unique guard band to each of the set of transmission sources based on the interference information. The processor instructions cause the processor to share details of the unique guard band assigned to a first transmission source within the set of transmission sources with the camera, wherein the camera is configured as the receiver of the first transmission source. The processor instructions further cause the processor to instruct the camera to accept data transmitted by the first transmission source based on the assigned unique guard band and drop data transmitted by the remaining set of transmission sources.

In yet another embodiment, a camera is disclosed. The camera includes a processor and a memory communicatively coupled to the processor, wherein the memory stores processor instructions, which, on execution, causes the processor to detect interference from a set of transmission sources. Each of the set of transmission sources are within a capture area of a camera associated with the camera based receiver. Each of the set of transmission sources comprises a set of lights configured to display one of a plurality of colors. The processor instructions further cause the processor to receive details of a unique guard band assigned to a first transmission source within the set of transmission sources. The camera is configured to receive the first transmission source. Each of the set of transmission sources is assigned a unique guard band. The processor instructions cause the processor to process data transmitted by the set of transmission sources, wherein to process the data, the processor instructions further cause the processor to accept data transmitted by the first transmission source based on the assigned unique guard band and drop data transmitted by the remaining set of transmission sources.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1A:
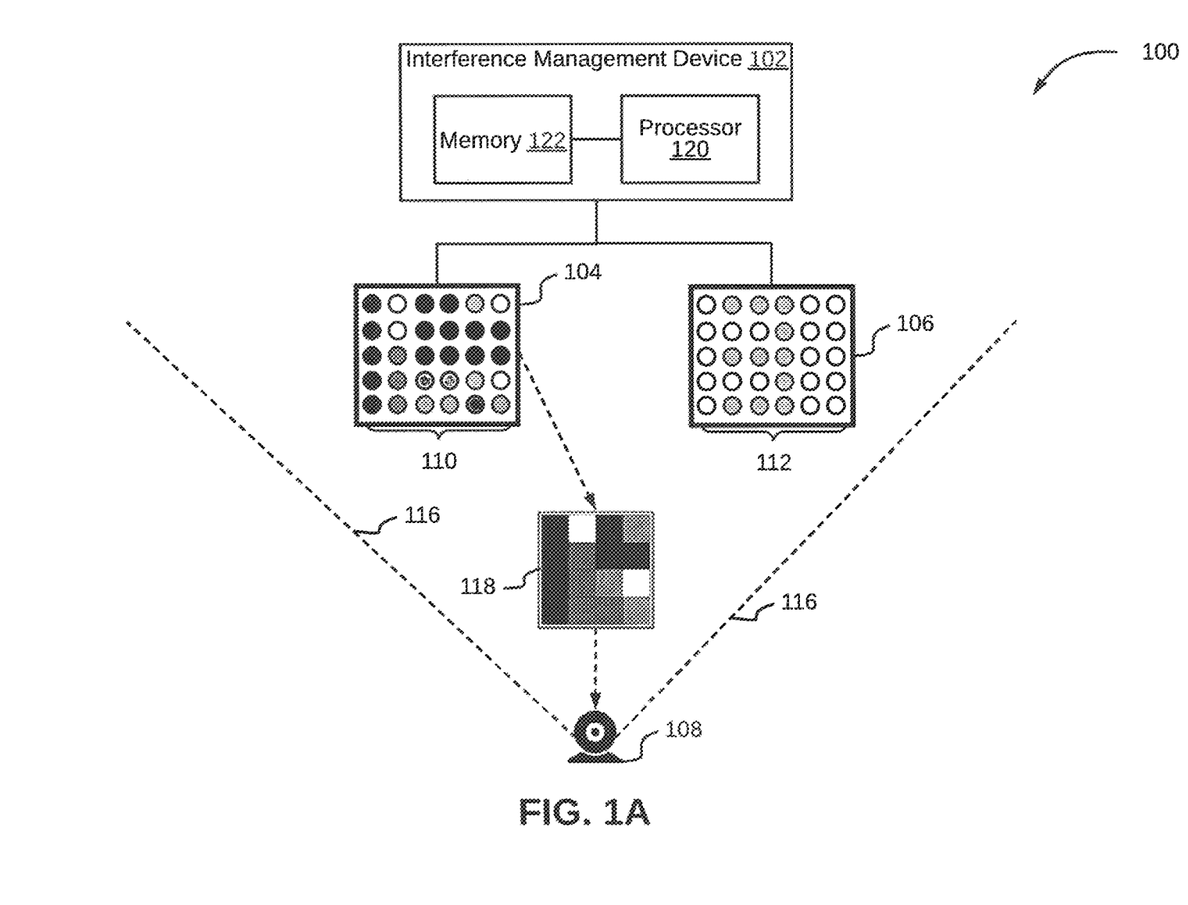
FIGS. 1A and 1B illustrate a system for managing interference between transmission sources in an Optical Camera Communication (OCC) network, in accordance with some embodiments.
Figure 1B:
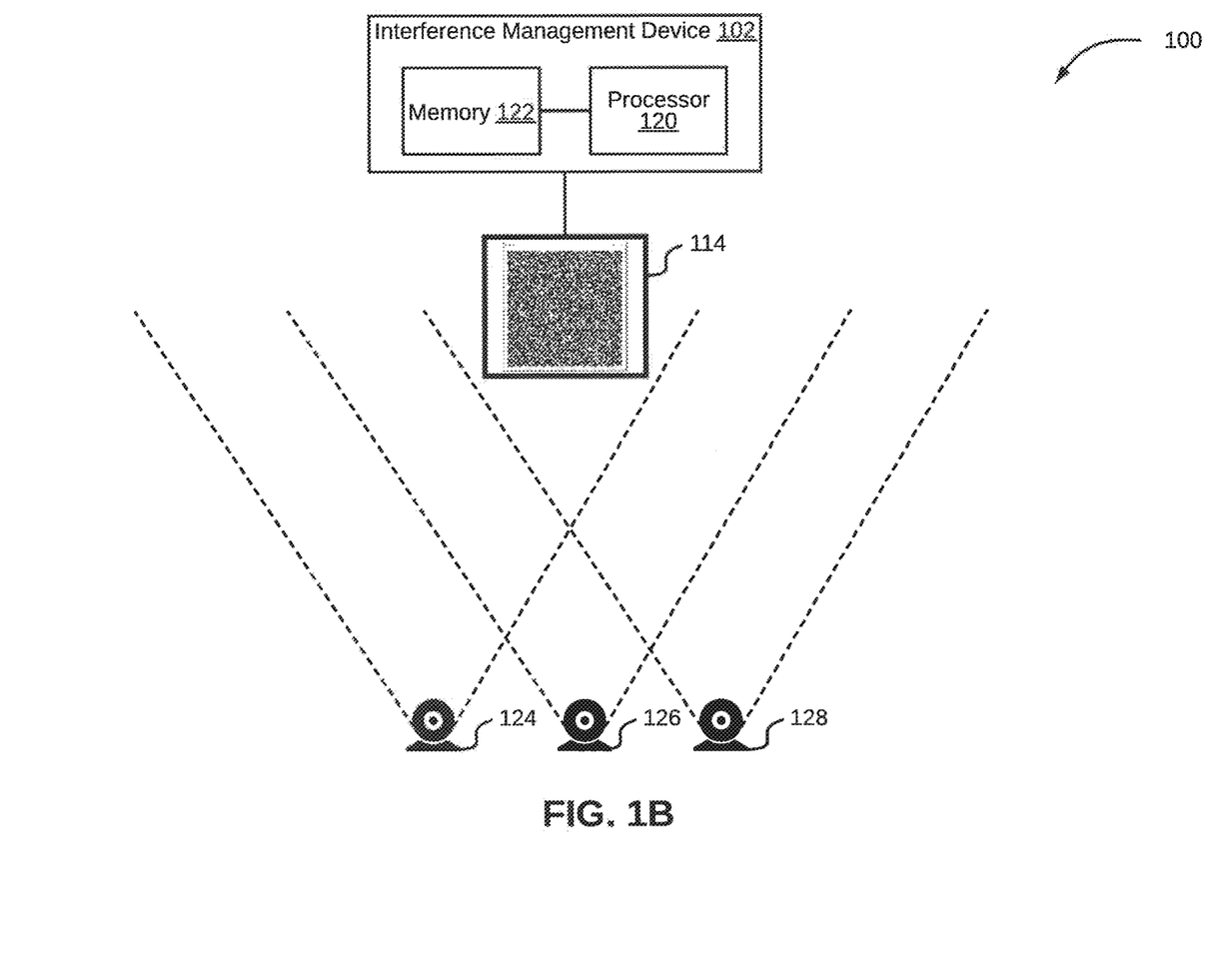

In some embodiment, a system 100 for managing interference between transmission sources in an Optical Camera Communication (OCC) network is illustrated in FIGS. 1A and 1B. The system 100 includes an inference management device 102, which is configured to manage interference between a transmission source 104 and a transmission source 106 as experienced by a camera 108 (or a User Equipment (UE)). Each of the transmission source 104 and the transmission source 106 may include a set of light sources. By way of an example, the transmission source 104 includes a set of light sources 110 and the transmission source 106 includes a set of light sources 112.

Each of the set of lights sources 110 and 112 may be a matrix of Light Emitting Diode (LED) bulbs that are spatially arranged. Alternatively, the set of lights sources 110 and 112 may be a plurality of pixels. In this case, each of the transmission sources 104 and 106 may be display screens. Examples of display screens may include, but are not limited to LED screen, Liquid Crystal Display (LCD) screen, Organic LED (OLED) screen, or Active-Matrix OLED (AMOLED) screen. Thus, each light source within the set of lights sources 110 and 112 may be configured to display one of a plurality of colors. As a result, a dot matrix formed by either the LED bulbs or pixels may create a pattern that may encode information which is required to be transmitted to the camera 108. In both the implementations, i.e., the LED bulbs and the pixels, a unique pattern may be formed using one or more of on-off status and colors of pixels or LED bulbs.

By way of an example, an input data (which may be text, image, or video) that needs to be transmitted to the camera 108, may be represented using a Quick Response (QR) code by a transmission source (for example, the transmission source 104). In one scenario, the transmission source may be a display screen and the pixels may be used to display the OR code, as an example of spatially arranged coding scheme that is used in OCC network. A transmission source 114, in FIG. 1B, depicts a screen displaying a QR code. In this case, the transmit area may either be dynamic or fixed. In other words, the QR code may either cover a portion of the display screen or the whole display screen, based on a current implementation. Further, in this scenario, a set of color patterns may be used to encode information that is required to be transmitted.

In another scenario, a transmission source may include an LED matrix (as depicted by the transmission sources 104 and 106) and the QR code may be a color pattern based QR code. In this case, the information to be transmitted may be encoded by color codes emitted by a set of spatially arranged LEDs in the LED matrix. A color emitted by each LED may carry a number of bits from the information to be transmitted. This may further vary based on the number of colors that may be decoded by the camera 108. It will be apparent to a person skilled in the art that if more number of colors may be used to encode the information, overall throughput of the system 100 may increase.

The information encoded in a pattern displayed on a transmission source is received and read by the camera 108, which acts as a receiver. A capture area 116 of the camera 108 is depicted in FIG. 1A. The camera 108 may take the snap of the free space between the transmission sources 104 and 106. The camera 108 preserves the spatial information that may be used to decode the encoded information transmitted by one or more of the transmission sources 104 and 106. The information may be transmitted by the transmission sources 104 and 106 in the form of transmit frames. When a transmission source includes an LED matrix, for example, the transmission source 104, a transmit frame 118 may be transmitted. A receiver module (not shown in FIG. 1A) within the camera 108 processes the transmit frame 118 captured by the camera 108 to decode the information thus transmitted by the transmission source 104. It will be apparent to a person skilled in the art that the receiver module may be located outside the camera 108.

However, since the capture area 116 of the camera 108 covers both the transmission sources 104 and 106, at a given time, the camera 108 may receive transmit frames from both the transmission sources 104 and 106. This may lead to an interference experienced by the camera 108. The interference management device 102, which is in communication with the camera 108, may detect this interference. It will be apparent to a person skilled in the art that the interference management device 102 and the camera 108 may be located in separate devices. The communication between the camera 108 and the interference management device 102 is explained in detail in conjunction with FIG. 2. In order to mitigate and manage the interference thus detected, the interference management device 102 may assign different guard bands to each of the transmission sources 104 and 106. As a result, each transmit frame may have a unique guard band.

The interference management device 102 may additionally communicate the information regarding mapping of unique guard bands to respective transmission sources to the camera 108. The communication between the interference management device 102 and the camera 108 is explained in detail in conjunction with FIG. 2. By way of an example, the transmission source 104 may be allocated a guard band having red color, while the transmission source 106 may be allocated a guard band having blue color. As a result, when the camera 108 receives a transmit frame with a red guard band, the camera 108 is able to identify that the transmission source 104 has transmitted the transmit frame. Moreover, the camera 108 may be connected or attached to the transmission source 104. Thus, the camera 108 may accept the transmit frames transmitted by the transmission source 104 and may ignore the transmit frames transmitted by the transmission source 106. To this end, the camera 108 may accept transmit frames that have a red guard band and may reject/ignore transmit frames that have a blue guard band. As a result of the guard bands, the camera 108 is able to eliminate noise. This is further explained in detail in conjunction with FIG. 2.

In order to manage and further mitigate the interference between the transmission sources 104 and 106, the inference management device 102 includes a processor 120 that is communicatively coupled to a memory 122. The memory 122 may store instructions that, when executed by the processor 120, cause the processor 120 to manage interference between transmission sources, as discussed in greater detail in FIG. 2 to FIG. 8. The memory 122 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM).

Referring now to FIG. 1B, the transmission source 114 is shared by cameras 124, 126, and 128, as the transmission source 114 lies in the capture areas of each of the cameras 124, 126, and 128. In this case, after the interference management device 102 identifies interference, the interference management device 102 may assign three separate orthogonal codes to each of the cameras 124, 126, and 128. By way of an example, the interference management device 102 may generate the following orthogonal codes [[1 1 1 1], [1 1 −1 −1], [1 −1 1 −1]], as specified in the Code generation and allocation section of ETSI TS 125 213 V13.0.0 (2016-01) [UTMS Spreading and Modulation (FDD)]. The interference management device 102 may then share these with the cameras 124, 126, and 128. The camera 124 may be assigned the orthogonal code: [1 1 1 1], the camera 126 may be assigned the orthogonal code: [1 1 −1 −1], and the camera 128 may be assigned the orthogonal code: [1 −1 1 −1]. By using the orthogonal codes, the interference management device 102 is able to maintain orthogonality in the multi-user data which is transmitted using a single channel. It will be apparent to a person skilled in the art that the embodiment is not limited to three cameras. This is further explained in detail in conjunction with FIG. 3.

Figure 2:
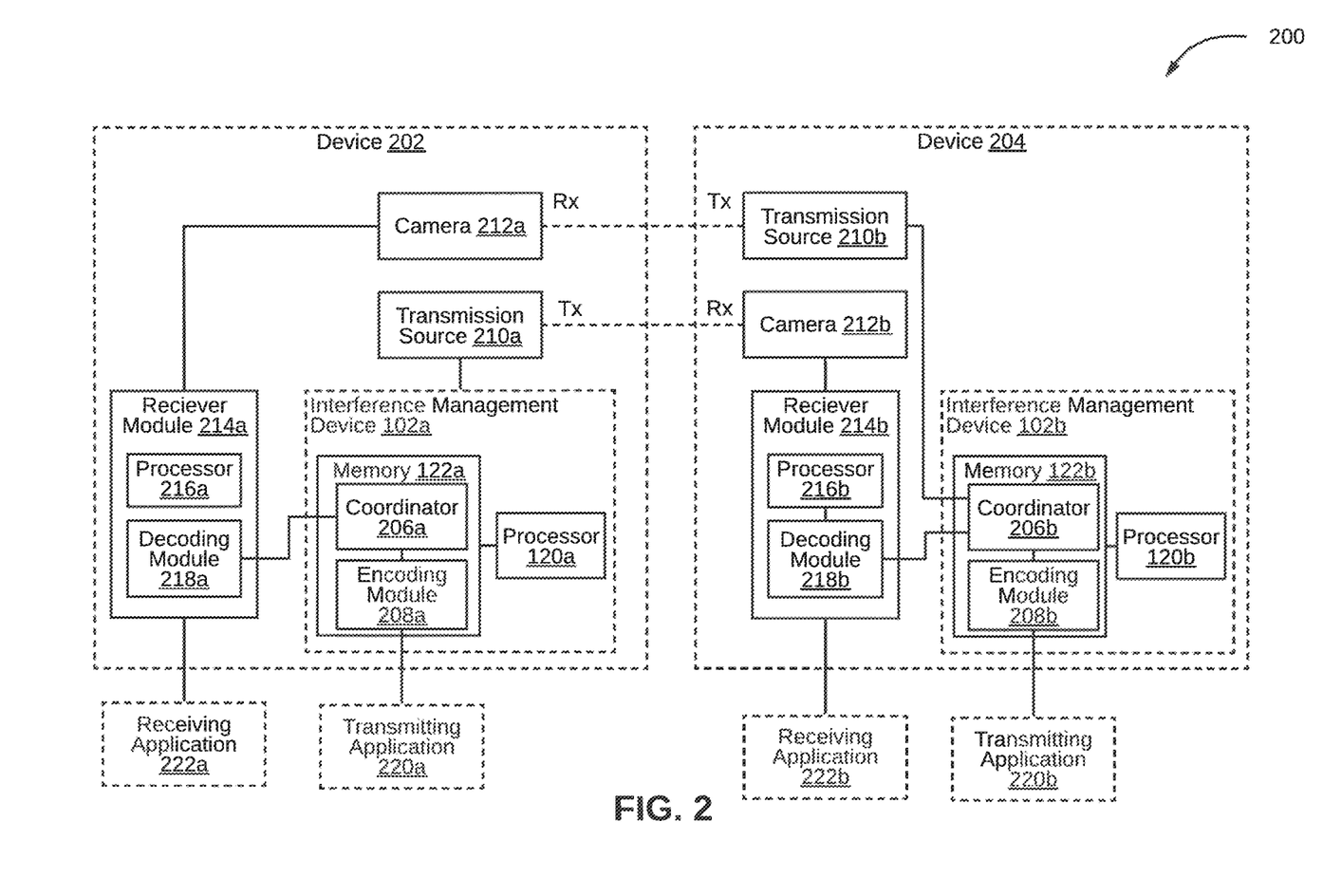
FIG. 2 illustrates a functional block diagram of a system for managing interference between transmission sources within a first device and a second device in an OCC network, in accordance with an embodiment.

Referring now to FIG. 2, a functional block diagram of a system 200 for managing interference between transmission sources within a device 202 and a device 204 in an OCC network is illustrated, in accordance with an embodiment. Examples of each of the devices 202 and 204 may include any computing device that includes a camera and a transmission source (for example, one of the transmission sources 104, 106, and 114). The device 202 includes a memory 122a (analogous to the memory 122) that is communicatively coupled to a processor 120a (analogous to the processor 120). The memory 122a further includes a coordinator 206a and an encoding module 208a, which is communicatively coupled to the coordinator 206a. The coordinator 206a is further explained in detail in conjunction with FIG. 3. As is apparent from the FIG. 2, the memory 122a and the processor 120a may be present inside an interference management device 102a (analogous to the interference management device 102). Alternatively, the memory 122a and the processor 120a may be located within any device of the OCC network. The coordinator 206a is further communicatively coupled to a transmission source 210a which may be analogous to one of the transmission sources 104, 106, or 114. The device 202 may further include a camera 212a, which may be analogous to the camera 108. The camera 212a may further be communicatively coupled to a receiver module 214a. Though the receiver module 214a is depicted as being present outside the camera 212a, the receiver module 214a may be located within the camera 212a in some embodiments. The receiver module 214a further includes a processor 216a and a decoding module 218a.

In a similar manner, the device 204 includes a memory 122b (analogous to the memory 122) that is communicatively coupled to a processor 120b (analogous to the processor 120). The memory 122b further includes a coordinator 206*b* and an encoding module 208*b*, which is communicatively coupled to the coordinator 206*b*. The coordinator 206*b* is further explained in detail in conjunction with FIG. 3. As is apparent from the FIG. 2, the memory 122*b* and the processor 120*b* may be present inside an interference management device 102*b* (analogous to the interference management device 102). Alternatively, the memory 122*b* and the processor 120*b* may be located within any device of the OCC network. The coordinator 206*b* is further communicatively coupled to a transmission source 210*b*, which may be analogous to one of the transmission sources 104, 106, or 114. The device 204 may further include a camera 212*b*, which may be analogous to the camera 108. The camera 212*b* may further be communicatively coupled to a receiver module 214*b*. Though the receiver module 214*b* is depicted as being present outside the camera 212*b*, the receiver module 214*b* may be located within the camera 212*b* in some embodiments. The receiver module 214*b* further includes a processor 216*b* and a decoding module 218*b*.

In the system 200, the camera 212*a* and the transmission source 210*b* form a first transceiver pair, while the camera 212*b* and the transmission source 210*a* form a second transceiver pair. In other words, information transmitted by the transmission source 210*b* is received and decoded by the camera 212*a* in conjunction with the receiver module 214*a*. In a similar manner, information transmitted by the transmission source 210*a* is received and decoded by the camera 212*b* in conjunction with the receiver module 214*b*.

By way of an example, a transmitting application 220*b*, which is communicatively coupled to the encoding module 208*b*, may want to transmit data to a receiving application 222*a* that is communicatively coupled to the camera 212*a* through the receiver module 214*a*. To this end, the transmitting application 220*b* shares the data with the encoding module 208*b*, which encodes the data to be transmitted based on a predetermined encoding pattern and the type of the transmission source 210*b* (i.e., a screen based transmission or an LED based transmission). The encoding module 208*b* then shares the encoded data with the coordinator 206*b*, which further communicates the encoded data to the transmission sources 210*b*. The transmission sources 210*b* then transmits the encoded data to the camera 212*a*. Methods of transmitting data from a transmission source to a camera have been explained in detail in conjunction with FIG. 1.

Figure 4:
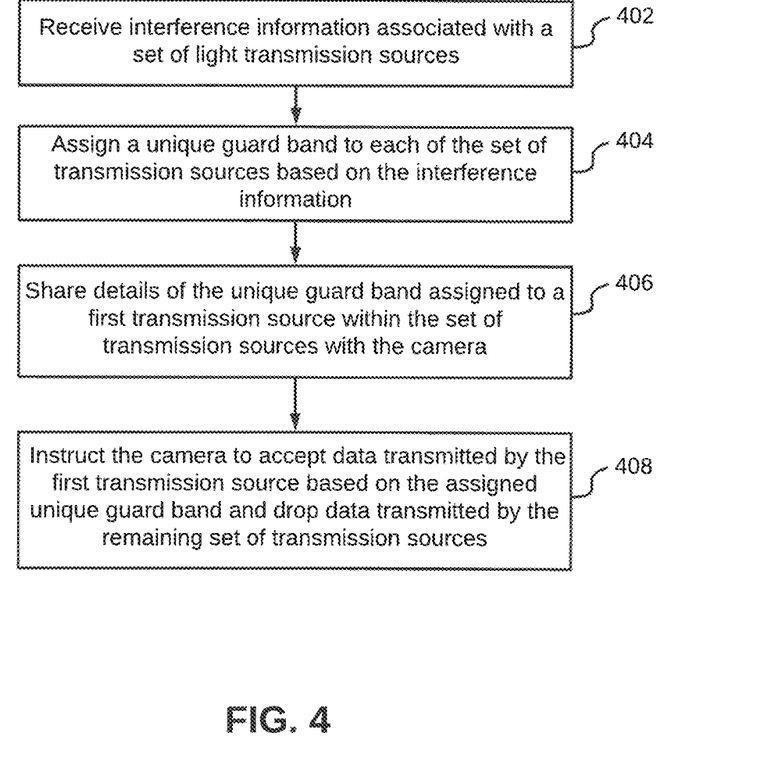
FIG. 4 illustrates a flowchart of a method for managing interference between transmission sources in an OCC network, in accordance with an embodiment.
Figure 5:
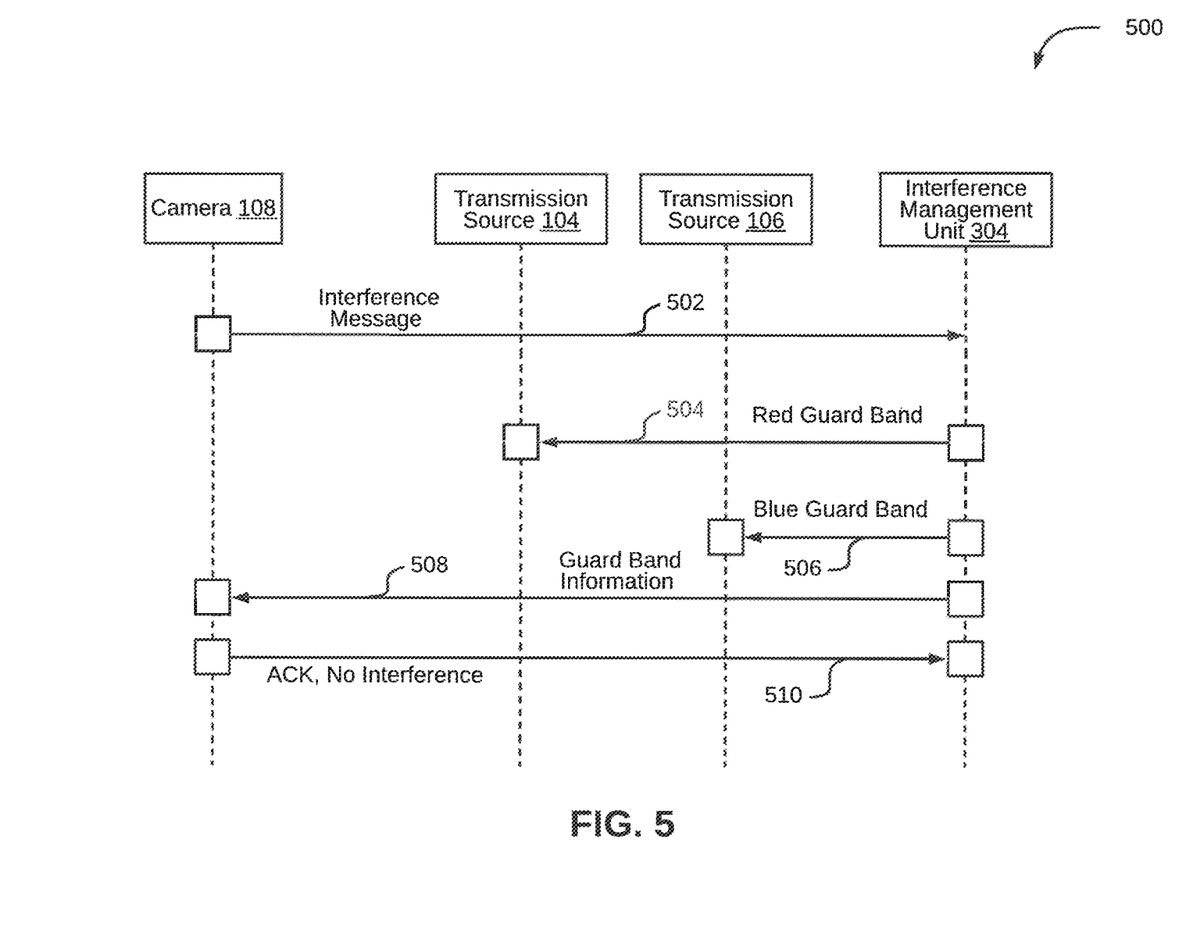
FIG. 5 illustrates a communication flow between a camera, two transmission sources, and an interference management unit for detection and management of interference between the two transmission sources, in accordance with an exemplary embodiment.

Once the camera 212*a* receives the encoded data as transmit frames, the decoding module 218*a* in the receiver module 214*a* decodes the encoded data to extract the information. The information is then shared with the receiving application 222*a*. Additionally, using a closed feedback loop, the decoding module 218*a* shares the decoded information with the coordinator 206*a*. Based on the decoded information, the coordinator 206*a* may determine whether the camera 212*a* is experiencing interference, as a result of multiple transmission sources within its capture area. The detection of interference may be communicated to the device 204, through the second transceiver pair, i.e., the transmission source 210*a* and the camera 212*b*. The decoding module 218*b* may share information associated with interference detection with the coordinator 206*b*, which may then manage the interference by assigning unique guard bands. This is further explained in detail in conjunction with FIG. 3. FIG. 4, and FIG. 5.

By way of another example, a transmitting application 220*a*, which is communicatively coupled to the encoding module 208*a*, may want to transmit data to a receiving application 222*b* that is communicatively coupled to the camera 212*b* through the receiver module 214*b*. A similar mechanism as detailed in the example above is followed in this case as well.

Figure 3:
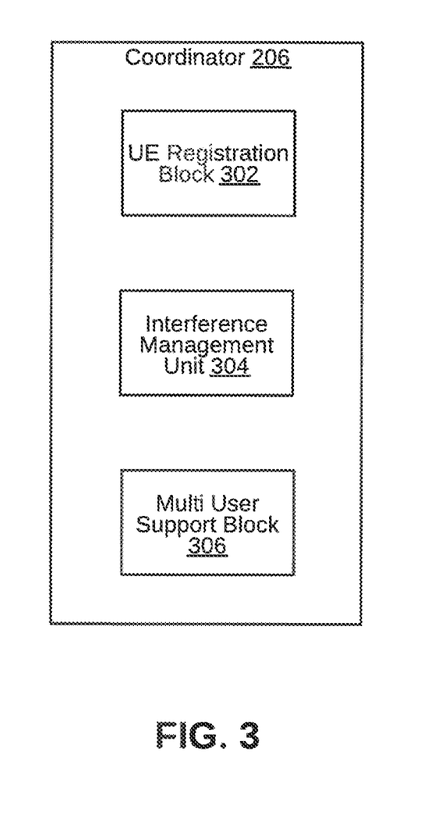
FIG. 3 illustrates a functional block diagram of a coordinator for managing interference between transmission sources in an OCC network, in accordance with an embodiment.

Referring now to FIG. 3, a functional block diagram of a coordinator 206 for managing interference between transmission sources in an OCC network is illustrated, in accordance with an embodiment. The coordinator 206 is analogous to each of the coordinators 206*a* and 206*b*. The coordinator 206 includes a UE registration block 302, an interference management unit 304, and a multi user support block 306. The UE registration block 302 extracts and stores information of cameras (or UEs) in the vicinity of each of transmission source in order to perform one or more functionalities, which may include, but are not limited to providing multiple access, seamless handover to another transmission source, or interference detection. Additionally, the UE registration block 302 may include information of cameras (or UEs) that may have come in vicinity of a transmission source with connectivity requests.

The interference management unit 304 detects interference between a set of transmission sources and performs different techniques to manage and mitigate the interference and provide communication to cameras within an interference region. The functionality of the interference management unit 304 is further explained in detail in conjunction with FIG. 4 to FIG. 8. The multi user support block 306 provides multi-user support to the cameras (present both in overlapping and non-overlapping regions) in the vicinity using multiple access techniques (for example, CDMA). The multi user support block 306 may enable handling of multiple cameras attached to a single transmission sources by applying multiple access techniques to the camera. This has already been explained in conjunction with FIG. 1. Also, referring back to FIG. 1, each of the cameras 124, 126, and 128 may be registered in the UE registration block 302. Based on the number of users, the multi user support block 306 may generate orthogonal codes for each of the cameras 124, 126, and 128 and thus maintain orthogonality among the cameras 124, 126, and 128.

Referring now to FIG. 4, a flowchart of a method for managing interference between transmission sources in an OCC network is illustrated, in accordance with an embodiment. At step 402, the interference management device 102 may receive interference information associated with a set of transmission sources (for example, transmission sources 104 and 106). The interference information may be received from a camera (for example, the camera 108). In an embodiment, the coordinator 206 within the interference management device 102 may receive the interference information from the camera 108. Each of the set of transmission sources are within a capture area of the camera 108. Further, each of the set of transmission sources may include a set of light sources that are configured to display one of a plurality of colors. By way of an example, the transmission source 104 includes the set of light sources 110 and the transmission source 106 includes the set of light sources 112. This has been already been explained in detail in conjunction with FIG. 1.

Based on the interference information, the interference management device 102, at step 404, assigns a unique guard band to each of the set of transmission sources. In an embodiment, the coordinator 206 assigns a unique guard band. By way of an example, for the transmission sources 104 and 106, the coordinator 206 may assign a reg guard band to the transmission source 104 and a blue guard band to the transmission source 106. The camera (for example, the camera 108) is configured as the receiver of a first transmission source within the set of transmission sources (for example, the transmission source 104). In other words, the camera is communicatively coupled to the first transmission source, as explained in detail in conjunction with FIG. 2. At step 406, the interference management device 102 may share details of the unique guard band assigned to the first transmission source (for example, the transmission source 104) with the camera (for example, the camera 108). By way of an example, the coordinator 206 may share with the camera 108 that a red guard band has been assigned to the transmission source 104. The communication between the coordinator 206 and the camera 108 with regards to the guard bands may be in conformance with the communication mechanism explained in FIG. 2.

Thereafter, the interference management device 102 may instruct the camera (for example, the camera 108), at step 408, to accept data transmitted by the first transmission source based on the assigned unique guard band and drop data transmitted by the remaining set of transmission sources. These instruction may be sent using the communication mechanism explained in FIG. 2. In an embodiment, the coordinator 206 may send these instructions to the camera. By way of an example, since the camera 108 is attached to the transmission source 104, the coordinator 206 may instruct the camera 108 to accept transmit frames that have a red guard band and to drop transmit frames that have a blue guard band. This is further explained in detail in conjunction with FIG. 5.

Referring now to FIG. 5, a communication flow 500 between the camera 108, the transmission sources 104 and 106, and the interference management unit 304 for detection and management of interference between the transmission sources 104 and 106 is illustrated, in accordance with an embodiment. At 502, the camera 108 sends an interference message to the interference management unit 304 in the coordinator 206. The interference message may include a Negative Acknowledgment (NACK). The interference message may include information related to interference between the transmission sources 104 and 106 as detected by the camera 108. In response, the interference management unit 304 may assign a red guard band to the transmission source 104, at 504, and a blue guard band to the transmission source 106, at 506.

Further, at 508, the interference management unit 304 may share the information regarding guard band assignment with the camera 108 and may also instruct the camera 108 to accept transmit frames with red guard bands and drop transmit frames with blue guard bands. At 510, the camera 108 responds back with an Acknowledgement (ACK) message to the interference management unit 304, indicating that the camera 108 is not experiencing any interference.

Figure 6:
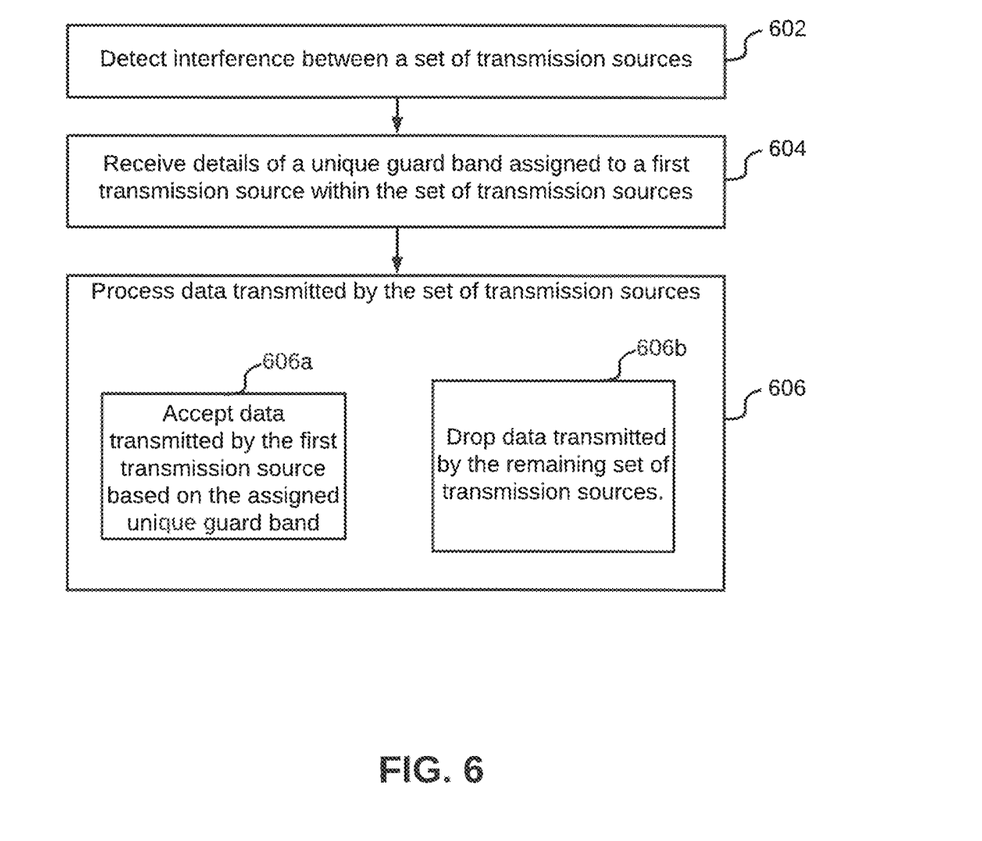
FIG. 6 illustrates a flowchart of a method for processing data transmitted by a set of transmission sources, in accordance with an embodiment.

Referring now to FIG. 6, a flowchart of a method for processing data transmitted by a set of transmission sources after detection of interference between the set of transmission sources is illustrated, in accordance with an embodiment. In an embodiment, the data transmitted by the set of transmission sources is processed by a camera (for example, the camera 108). At step 602, the camera detects interference between the set of transmission sources by the camera. At step 604, the camera receives details of a unique guard band assigned to a first transmission source (for example, the transmission source 104) within the set of transmission sources. This has already been explained in detail in conjunction with FIG. 4.

At step 606, the camera processes data transmitted by the set of transmission sources. The data may be processed by accepting, at step 606a, data transmitted by the first transmission source based on the assigned unique guard band. Additionally or alternatively, the camera, at step 606b, may drop data transmitted by the remaining set of transmission sources. This has already been explained in detail in conjunction with FIG. 4.

Figure 7:
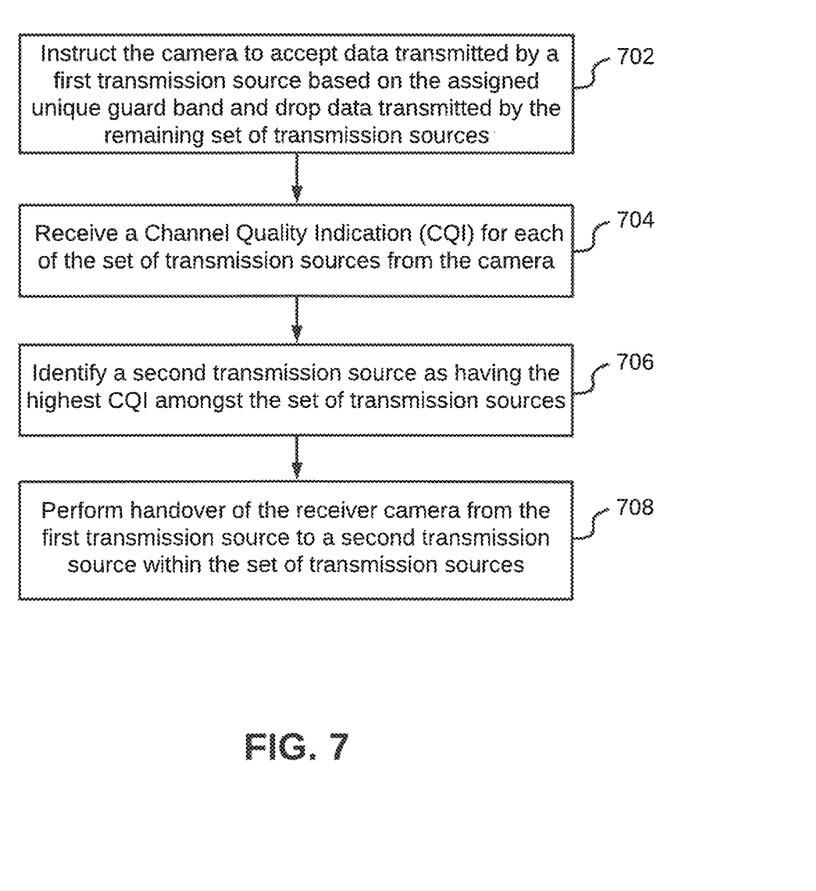
FIG. 7 illustrates a flowchart of a method for handover of a camera from a first transmission source to a second transmission source, in accordance with an embodiment.

Referring now to FIG. 7, a flowchart of a method for handover of a camera from a first transmission source to a second transmission source is illustrated, in accordance with an embodiment. At step 702, the interference management device 102 instructs the camera (for example, the camera 108) to accept data transmitted by the first transmission source (for example, the transmission source 104) based on an assigned unique guard band and drop data transmitted by the remaining set of transmission sources (for example, the transmission source 104). At step 704, the interference management device 102 may receive a Channel Quality Indication (CQI) for each of the set of transmission sources from the camera. A CQI for an associated transmission source may be calculated based on Packet Error Ratio (PER) of the associated transmission source. By way of an example, the CQI for the transmission source 104 may be computed based on a PER for the transmission source 104.

At step 706, the interference management device 102 identifies a second transmission source (for example, the transmission source 106) that has the highest CQI amongst the set of transmission sources. At step 708, the interference management device 102 performs handover of the camera from the first transmission source to the second transmission source. This is further explained in detail in conjunction with FIG. 8.

Figure 8:
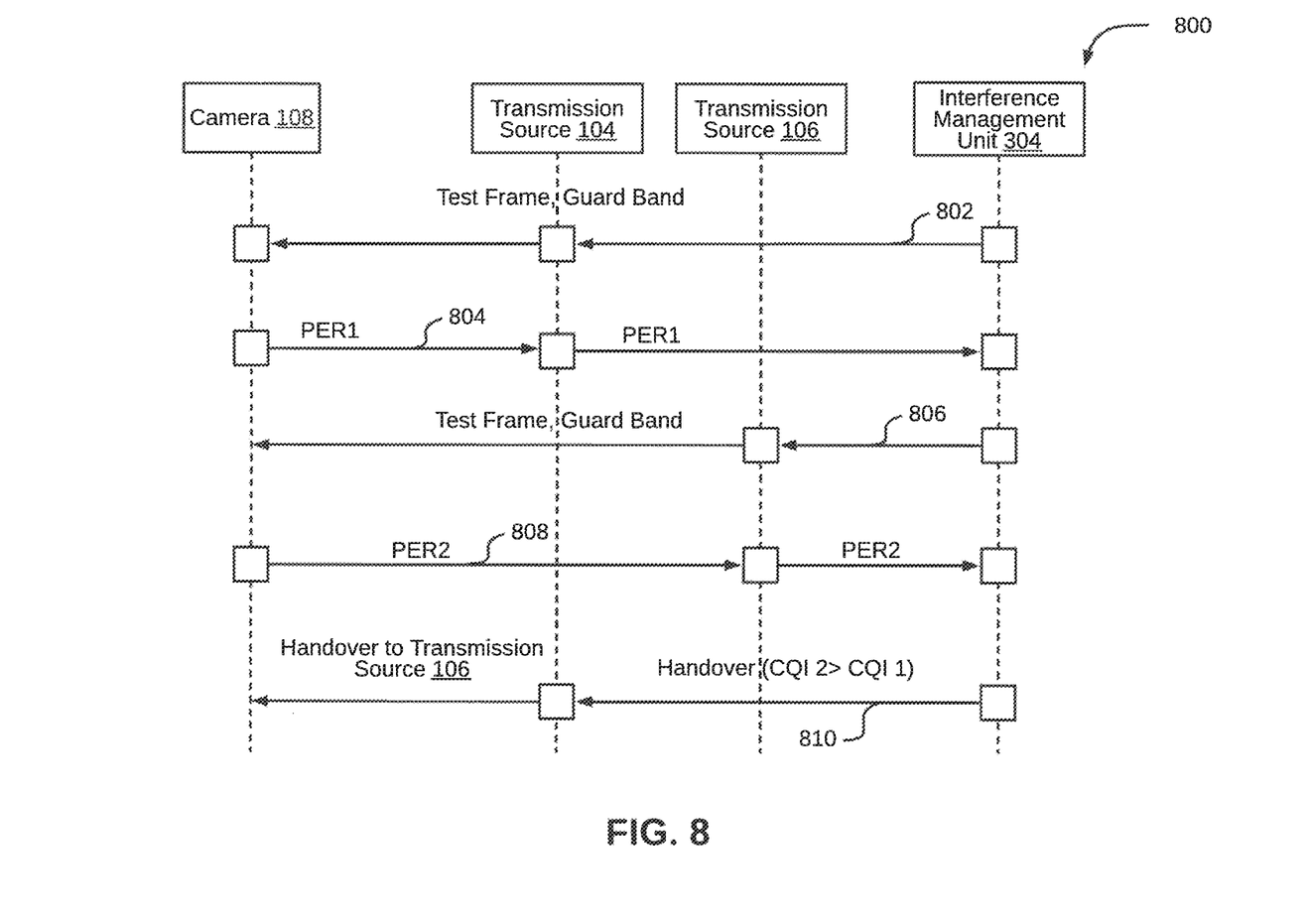
FIG. 8 illustrates a communication flow between a camera, two transmission sources, and an interference management unit for handover of the camera from a first transmission source to a second transmission source, in accordance with an embodiment.

Referring now to FIG. 8, a communication flow 800 between the camera 108, the transmission sources 104 and 106, and the interference management unit 304 for handover of the camera 108 from the transmission source 104 to the transmission source 106 is illustrated, in accordance with an embodiment. The camera 108 is attached or connected to the transmission source 104. At 802, the interference management unit 304 instructs the transmission source 104 to send a test frame along with the assigned guard band to the camera 108. On receipt of these instructions, the transmission sources 104 sends a test frame to the camera 108. Based on the test frame, at 804, the camera 108 sends a PER value to the transmission source 104, which shares the PER value with the interference management unit 304.

In a similar manner, at 806, the interference management unit 304 instructs the transmission source 106 to send a test frame along with the assigned guard band to the camera 108. On receipt of these instructions, the transmission sources 106 sends a test frame to the camera 108. Based on the test frame, at 808, the camera 108 sends a PER value to the transmission source 106, which further shares the PER value with the interference management unit 304.

Once the interference management unit 304 receives the PER values associated with the transmission sources 104 and 106, the interference management unit 304 determines the CQI associated with each of the transmission sources 104 and 106. In this case, the CQI associated with the transmission source 106 is higher than the CQI associated with the transmission source 104. Thus, the interference management unit 304, at 810, instructs the camera 108, via the transmission source 104, to handover to the transmission source 106. It will be apparent to a person skilled in the art that such handover of the camera 108 may iteratively be executed based on CQI associated with each of the transmission sources 104 and 106.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

One or more techniques described in the various embodiments discussed above provide for interference detection due to multiple transmit sources in a capture area, using the help of receiver camera. The various embodiments also provide for interference mitigation using guard bands in order to overcome interference due to multiple transmit sources. A smart handover technique is further provided that initiates handover at any point of time after the initiation of data transmission based on channel conditions. Moreover, the various embodiments provide for multi-user support using CDMA technique for single carrier as well as multi-carrier transmit signals.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for managing interference between transmission sources in an Optical Camera Communication (OCC) network, the method comprising
   receiving, by an interference management device, interference information associated with a set of transmission sources, wherein each of the set of transmission sources are within a capture area of a camera, and wherein each of the set of transmission sources comprises a set of light sources configured to display one of a plurality of colors;
   assigning, by the interference management device, a unique guard band to each of the set of transmission sources based on the interference information;
   sharing, by the interference management device, details of the unique guard band assigned to a first transmission source within the set of transmission sources with the camera, wherein the camera is configured as the receiver of the first transmission source;
   instructing, by the interference management device, the camera to accept data transmitted by the first transmission source based on the assigned unique guard band and drop data transmitted by the remaining set of transmission sources; and
   assigning, by the interference management device, an orthogonal code to the camera in the OCC network, wherein the camera communicates with a single transmission source within the set of transmission sources.

2. The method of claim 1, wherein a unique guard band assigned to a transmission source corresponds to an Identifier (ID) for the transmission source.

3. The method of claim 1, wherein the interference information comprises a Negative Acknowledgment (NACK) received from the camera.

4. The method of claim 1, further comprising receiving a Channel Quality Indication (CQI) for each of the set of transmission sources from the camera.

5. The method of claim 4, further comprising performing handover of the camera from the first transmission source to a second transmission source within the set of transmission sources, wherein a CQI associated with the second transmission source is highest amongst the set of transmission sources.

6. The method of claim 4, wherein a CQI for an associated transmission source is calculated based on Packet Error Ratio (PER) of the associated transmission source.

7. A method for managing interference between transmission sources in an Optical Camera Communication (OCC) network, the method comprising:
   detecting, by a camera, interference from a set of transmission sources, wherein each of the set of transmission sources are within a capture area of the camera, and wherein each of the set of transmission sources comprises a set of lights configured to display one of a plurality of colors;
   receiving, by the camera, details of a unique guard band assigned to a first transmission source within the set of transmission sources, wherein the camera is configured to receive the first transmission source, and wherein each of the set of transmission sources is assigned a unique guard band;
   processing, by the camera, data transmitted by the set of transmission sources, wherein processing comprises:
      accepting data transmitted by the first transmission source based on the assigned unique guard band; and
      dropping data transmitted by the remaining set of transmission sources, wherein an orthogonal code is assigned to the camera in the OCC network, wherein the camera communicates with a single transmission source within the set of transmission sources.

8. A system for managing interference between transmission sources in an Optical Camera Communication (OCC) network, the system comprising:
 a processor; and
 a memory communicatively coupled to the processor, wherein the memory stores processor instructions, which, on execution, causes the processor to:
 receive interference information associated with a set of transmission sources, wherein each of the set of transmission sources are within a capture area of a camera, and wherein each of the set of transmission sources comprises a set of light sources configured to display one of a plurality of colors;
 assign a unique guard band to each of the set of transmission sources based on the interference information;
 share details of the unique guard band assigned to a first transmission source within the set of transmission sources with the camera, wherein the camera is configured as the receiver of the first transmission source;
 instruct the camera to accept data transmitted by the first transmission source based on the assigned unique guard band and drop data transmitted by the remaining set of transmission sources; and
 assign an orthogonal code to the camera in the OCC network, wherein the camera communicates with a single transmission source within the set of transmission sources.

9. The system of claim 8, wherein a unique guard band assigned to a transmission source corresponds to an Identifier (ID) for the transmission source.

10. The system of claim 8, wherein the interference information comprises a Negative Acknowledgment (NACK) received from the camera.

11. The system of claim 8, wherein the processor instructions further cause the processor to receive a Channel Quality Indication (CQI) for each of the set of transmission sources from the camera.

12. The system of claim 11, wherein the processor instructions further cause the processor to perform handover of the camera from the first transmission source to a second transmission source within the set of transmission sources, wherein a CQI associated with the second transmission source is highest amongst the set of transmission sources.

13. The system of claim 11, wherein a CQI for an associated transmission source is calculated based on Packet Error Ratio (PER) of the associated transmission source.

14. A camera comprising:
 a processor; and
 a memory communicatively coupled to the processor, wherein the memory stores processor instructions, which, on execution, causes the processor to:
 detect interference from a set of transmission sources, wherein each of the set of transmission sources are within a capture area of a camera, and wherein each of the set of transmission sources comprises a set of lights configured to display one of a plurality of colors;
 receive details of a unique guard band assigned to a first transmission source within the set of transmission sources, wherein the camera is configured to receive the first transmission source, and wherein each of the set of transmission sources is assigned a unique guard band;
 process data transmitted by the set of transmission sources, wherein to process the data, the processor instructions further cause the processor to:
 accept data transmitted by the first transmission source based on the assigned unique guard band; and
 drop data transmitted by the remaining set of transmission sources, wherein an orthogonal code is assigned to the camera in the OCC network, wherein the camera communicates with a single transmission source within the set of transmission sources.

* * * * *